(12) United States Patent
Salmonson

(10) Patent No.: US 6,256,307 B1
(45) Date of Patent: Jul. 3, 2001

(54) LOCAL AREA NETWORK RECEIVE FILTER

(75) Inventor: Grant Salmonson, Auburn, CA (US)

(73) Assignee: Hewlett-Packard Co., Palo Alto, CA (US)

( * ) Notice: Subject to any disclaimer, the term of this patent is extended or adjusted under 35 U.S.C. 154(b) by 0 days.

(21) Appl. No.: 09/049,762

(22) Filed: Mar. 27, 1998

(51) Int. Cl.[7] .................................................. H04L 12/56
(52) U.S. Cl. ............................................. 370/392; 370/401
(58) Field of Search ..................................... 370/230, 392, 370/463, 389, 401, 402, 403, 404, 405; 709/238, 245

(56) References Cited

U.S. PATENT DOCUMENTS 5,528,584 * 6/1996 Grant et al. ............................ 370/254
5,917,821 * 6/1999 Gobuyan et al. ..................... 370/392
6,018,524 * 1/2000 Turner et al. ......................... 370/392
6,118,776 * 9/2000 Berman ................................. 370/351

* cited by examiner

Primary Examiner—Chau Nguyen
Assistant Examiner—D. Trinh

(57) ABSTRACT

Filtering of network packets is performed. Within a filter controller, a base address for a range of addresses is stored. A second value is also stored which further specifies the range of addresses. When a network packet is received, a network controller extracts a destination address from the network packet. The network controller forwards the destination address to the filter controller. The filter controller compares the destination address to the range of addresses specified by the base address and the second value. The filter controller generates a signal which indicates when the destination address is outside the range of addresses.

12 Claims, 4 Drawing Sheets

LOCAL AREA NETWORK RECEIVE FILTER

BACKGROUND

The present invention concerns computer networking and pertains particularly to a local area network receive filter.

Communication between computers and other computing equipment is achieved through various types of networks. For example, computers and computer equipment within fairly close proximity are often connected using a local area network (LAN). For computers and computer equipment separated by a greater distance, wide area networks (WAN) may be used to make the connections.

Often LANs and/or WANs are connected together in order for one computer on a LAN or a WAN to communicate with another computer in a different LAN or WAN. LANs and WANs may be joined, for example, using a network bridge or a network router. Each of the individual LAN and WAN may be considered a network segment of a larger network.

When networks are interconnected, it is desirable for a LAN to be able to reject data packets not destined for an individual local network device within the LAN. This is done, for example, by filters within a network bridge or a network router which specifically reject data packets not destined for an individual local network device on the LAN.

Packet addresses are generally filtered using a software routine, or by a hardware device which uses content addressable memory (CAM).

Filtering via software involves a processor with a fast enough clock-rate to enable the software to read and, subsequently, compare addresses from each packet sent. A comparison algorithm matches the packet destination address for each packet with a similar address in a predefined look-up table of local network addresses. The overhead required by such a software implementation as well as the higher cost for the fast processor make this an unattractive solution, especially for faster network protocols, such as 100VG, 100TX and Gigabit.

Devices which use CAM hardware filtering overcome the speed disadvantage generally inherent in software filtering implementations. The CAM allows storage of the specific local network addresses within a memory array. As packet addresses are presented to the CAM, the CAM performs the comparison logic necessary to determine if there is a match. The CAM indicates there is a match when the destination address for a packet coincides with a local network address stored in the CAM. While the use of CAM devices overcomes some of the disadvantages of software filtering implementations, the high component costs of CAM devices (and the associated circuitry) is the primary limiting factor of utilizing this technology. Another downside of a CAM implementation is the small memory array sizes currently available.

SUMMARY OF THE INVENTION

In accordance with the preferred embodiment of the present invention network packets are filtered. Within a filter controller, a base address for a range of addresses is stored. A second value, for example, an offset range limit, is also stored which further specifies the range of addresses. When a network packet is received, a network controller extracts a destination address from the network packet. The network controller forwards the destination address to the filter controller. The filter controller compares the destination address to the range of addresses specified by the base address and the second value. The filter controller generates a signal which indicates when the destination address is outside the range of addresses.

In the preferred embodiment, the network packet has a frame topology compatible with the IEEE 802.3 standard and the destination address is a six-byte media access control (MAC) destination address. For example, the first value is stored in six eight-bit registers, the second value is stored in two eight-bit registers. While the filter controller compares the destination address to the range of addresses specified by the base address and the offset range limit, the destination address is temporarily stored in six eight-bit registers within the filter controllers.

The present invention provides for simple low-cost performance of network packet filtering. The preferred embodiment additionally has a low over-head impact on system performance.

DESCRIPTION OF THE PREFERRED EMBODIMENT

Figure 1:
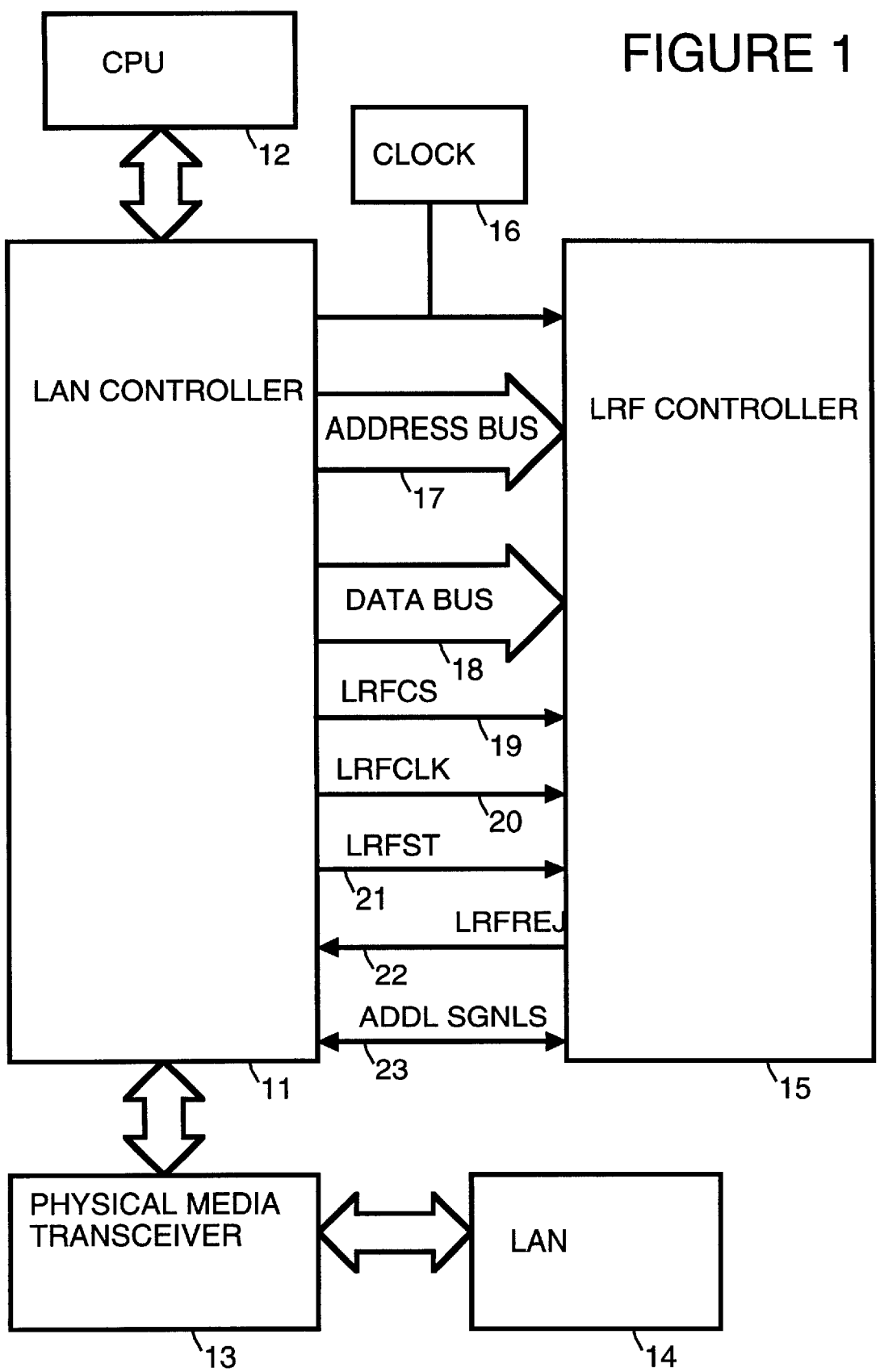
FIG. 1 is a simplified block diagram of a computing system which utilizes a local area network receive filter in accordance with a preferred embodiment of the present invention.

FIG. 1 is a simplified block diagram of a computing system. The computing system is connected to a local area network (LAN) 14 via a physical media transceiver 13. Data packets received by physical media transceiver 13 are forwarded to LAN controller 11 for processing before data is passed on to a central processing unit (CPU) 12.

When a data packet is received by LAN controller 11, a LAN receive filter (LRF) controller 15 is used to examine the destination address packets for a group (or range) of media access control (MAC) destination addresses. A clock 16 produces a clock signal used for both LAN controller 11 and LRF controller 15. For example clock 16 produces a clock signal having a 30 megahertz frequency.

LAN controller 11 provides typical functionality as is generally available from LAN controllers. For example, LAN controller 11 provides an integrated interface for a PCI backplane bus by which LAN controller 11 is connected to CPU 12. LAN controller 11 also provides a front plane bus interface for connection to physical media transceiver 13. Non-volatile memory (such as an EEPROM) within LAN controller 11 is used to store configuration values. A random access (RAM) is used for temporary storage of both incoming and outgoing network data. Read-only memory (ROM) is used to store boot software.

In addition, LAN controller 11 also provides an interface to LRF controller 15. The interface includes a four-bit address bus 17 which is used to select a MAC destination register within LRF controller 15. An eight-bit input data bus 18 is used to load the MAC destination registers within LRF 15 when filtering is being performed. A chip select (LRFCS) signal 19 (active low) is used to activate LRF controller 15.

A clock (LRFCLK) signal 20, synchronous to the clock signal generated by clock 16, is used to clock packet bytes into LANMAC registers within LRF controller. A packet rejection (LRFREJ) signal 22 (active low) is used by LRF controller to indicate that a specific MAC address for a packet is not within the range of addresses specified by the MAC registers and a mask register within LRF controller. The interface between LAN controller 11 and LRF controller 15 also includes additional miscellaneous signals 23 to initialize and test operation of LRF controller 15.

Figure 2:
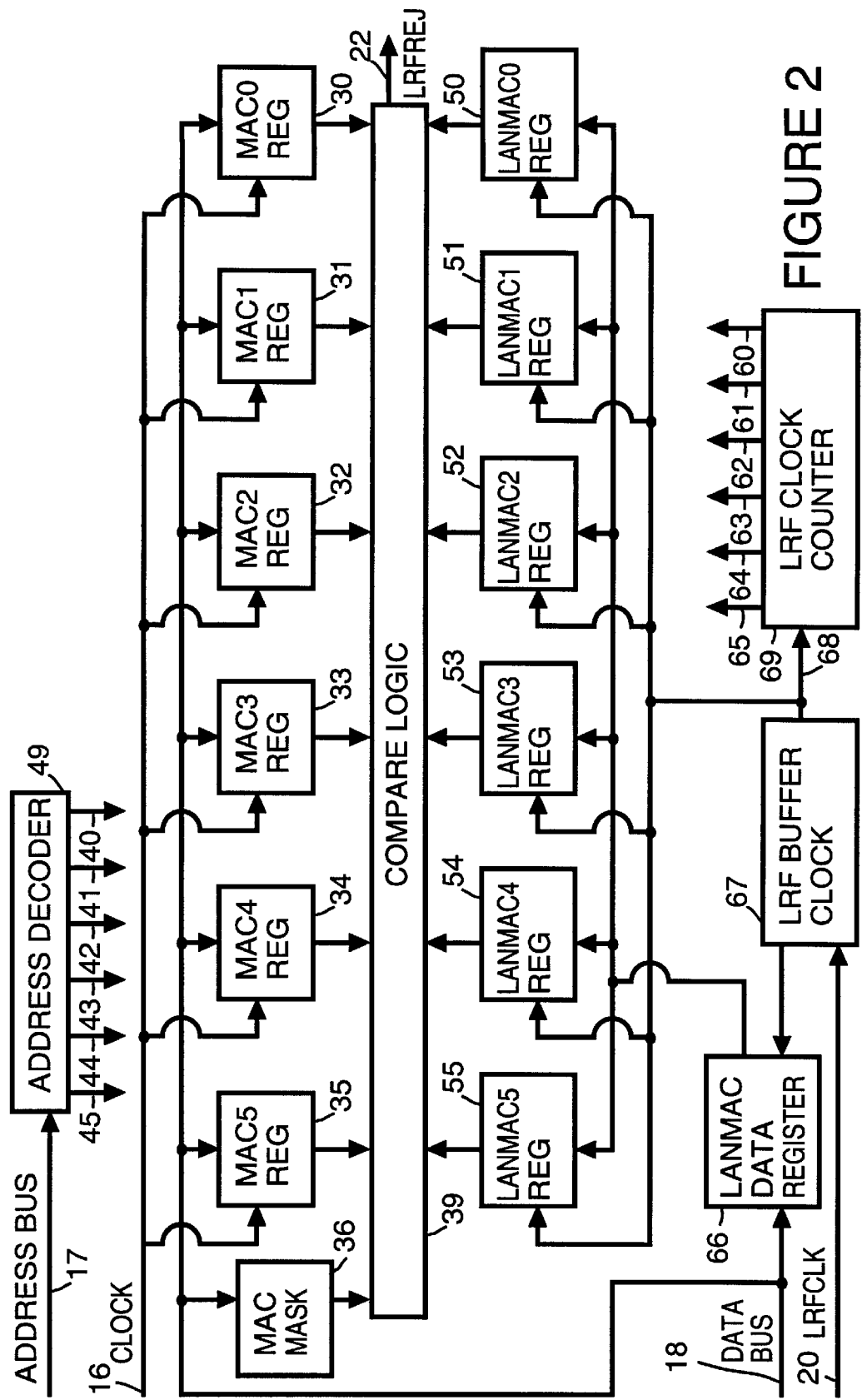
FIG. 2 is a simplified block diagram of a local area network receive filter in accordance with a preferred embodiment of the present invention.

FIG. 2 is a simplified block diagram of LRF controller 15. LRF controller includes six eight-bit MAC registers: a MAC0 register 30, a MAC1 register 31, a MAC2 register 32, a MAC3 register 33, a MAC4 register 34, and a MAC5 register 35. LRF controller also includes six eight-bit LANMAC registers: a LANMAC0 register 50, a LANMAC1 register 51, a LANMAC2 register 52, a LANMAC3 register 53, a LANMAC4 register 54, and a LANMAC5 register 55.

An eight-bit data bus 18 is used to load data into the MAC registers and from a LANMAC data register 66 into the LANMAC registers. An address decoder 49 uses four-bit values on address bus 17 to generate a MAC register enable signal 40 used to enable MAC0 register 30, a MAC register enable signal 41 used to enable MAC1 register 31, a MAC register enable signal 42 used to enable MAC2 register 32, a MAC register enable signal 43 used to enable MAC3 register 33, a MAC register enable signal 44 used to enable MAC4 register 34 and a MAC register enable signal 45 used to enable MAC5 register 35.

An LRF clock counter 69 uses a buffered clock signal 68, generated by an LRF buffer clock 67 from LRFCLK signal 20, to generate a LANMAC register enable signal 60 used to enable LANMAC0 register 50, a LANMAC register enable signal 61 used to enable LANMAC1 register 51, a LANMAC register enable signal 62 used to enable LANMAC2 register 52, a LANMAC register enable signal 63 used to enable LANMAC3 register 53, a LANMAC register enable signal 64 used to enable LANMAC4 register 54 and a LANMAC register enable signal 65 used to enable LANMAC5 register 55.

During initialization, a base MAC address is loaded into the six MAC registers. In addition, an offset range limit is loaded into a MAC mask 36. For example, MAC mask 36 is implemented by two eight-bit registers.

During filtering, MAC destination addresses for packets are forwarded to LRF controller 15 through data bus 18 and loaded into the six LANMAC registers. Compare logic 39 then checks whether the MAC destination address loaded into the LANMAC registers are within the address range specified by the base MAC address loaded into the six MAC registers and the offset range limit loaded into MAC mask 36.

Figure 3:
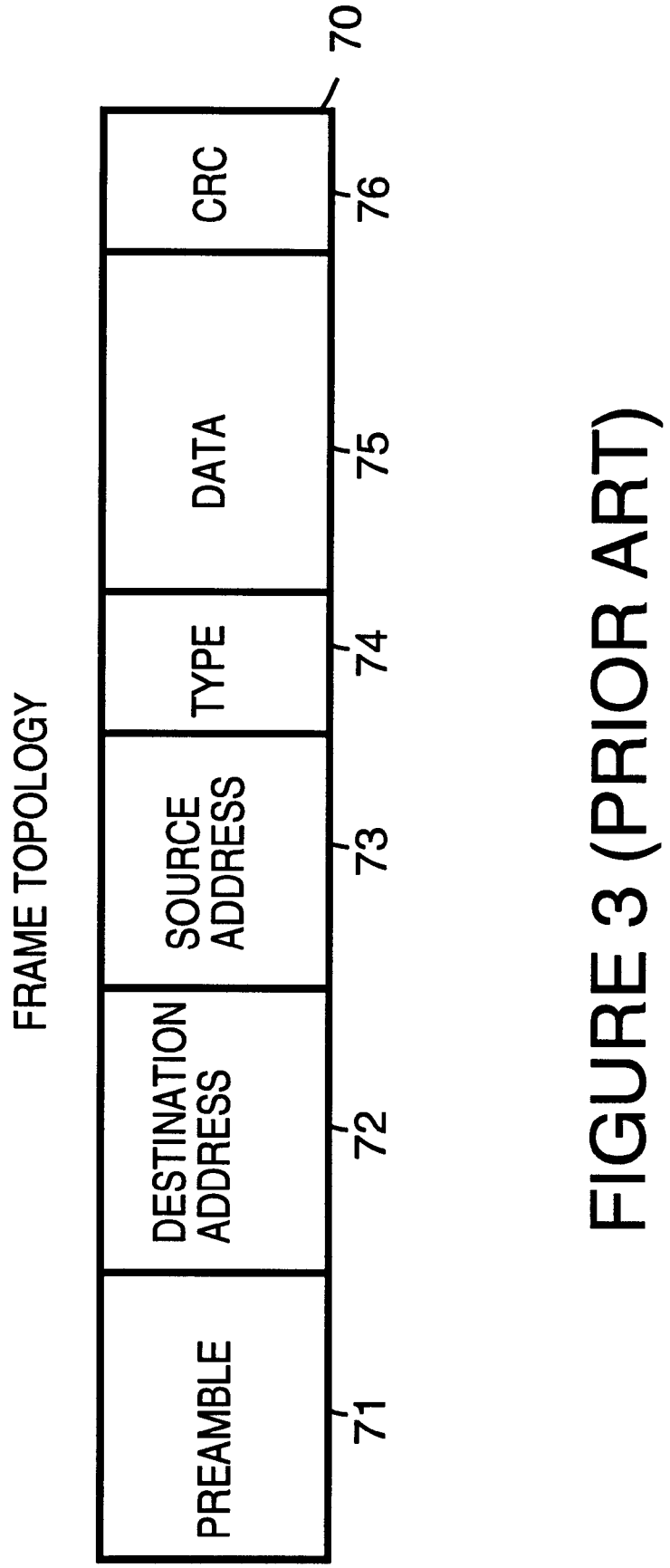
FIG. 3 is a simplified block diagram which illustrates frame topology for a network package that conforms to the IEEE 802.3 standard.

To further illustrate the invention, FIG. 3 shows the topology for a network package 70 that conforms to the IEEE 802.3 standard. A preamble section 71 consists of eight bytes. A destination address section 72 consists of six bytes. A source address section 73 consists of six bytes. A type section 74 consists of two bytes. A data section 75 consists of 46 to 1500 bytes. A cyclical redundancy check section 76 consists of four bytes.

Figure 4:
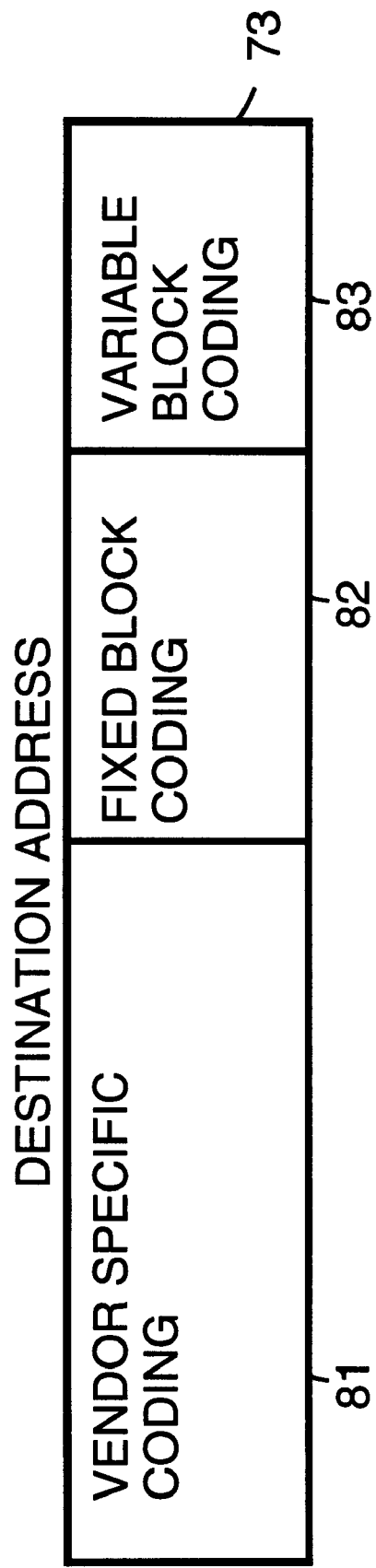
FIG. 4 is a simplified block diagram which illustrates topology for the destination address for a network packet that conforms to the IEEE 802.3 standard.

Destination address section 72 and source address section 73 each contain a six byte MAC address. FIG. 4 shows the topology for a MAC address. A vendor specific section 81 consists of three bytes which indicate a vendor specific prefix. A fixed block coding 82 consists of one and a half bytes. A variable block coding 83 consists of one and a half bytes.

Industry wide, MAC addresses are assigned out in blocks of 4096 (16×256) addresses (per block). The total possible number of blocks which can be assigned to one vendor is also 4096 (16×256). Therefore, the total number of MAC addresses for one specific vendor is $4096^2=16,777,216$.

As indicated above, in order to specify a subset of MAC addresses to be filtered for by LRF controller 15, a base MAC address is loaded into the six MAC registers and a two byte offset range limit is loaded into a MAC mask 36.

For example, the value $080009A9416A_{hex}$ is loaded into the six MAC registers. This is done by loading the value $6A_{hex}$ into MAC0 register 30, loading the value $41_{hex}$ into MAC1 register 31, loading the value $A9_{hex}$ into MAC2 register 32, loading the value $09_{hex}$ into MAC3 register 33, loading the value $00_{hex}$ into MAC4 register 34 and loading the value $08_{hex}$ into MAC5 register 35.

In order to allow LRF controller 15 to filter for eight destination MAC addresses starting at the base address of $080009A9416A_{hex}$, the offset range limit $4171_{hex}$ is loaded into MAC mask 36. This allows LRF controller to filter for the following eight destination MAC addresses: $080009A9416A_{hex}$, $080009A9416B_{hex}$, $080009A9416C_{hex}$, $080009A9416D_{hex}$, $080009A9416E_{hex}$, $080009A9416F_{hex}$, $080009A94170_{hex}$ and $080009A9471_{hex}$.

When LAN controller 11 receives a packet, LAN controller 11 enables LRF controller 15 by asserting LRFCS signal 19. LAN controller 11 then transfers to LRF controller 15 the destination MAC address for the packet. This is done one byte at a time using LRFCLK signal 20. LRF clock counter 69 enables LANMAC0 register 50, LANMAC1 register 51, LANMAC2 register 52, LANMAC3 register 53, LANMAC4 register 54, and LANMAC5 register 55 in sequence to allow the destination MAC address for the packet to be loaded into the LANMAC registers of LRF 15. Compare logic 39 asserts LRFREJ signal 22 when the destination MAC address loaded into LANMAC0 register 50, LANMAC1 register 51, LANMAC2 register 52, LANMAC3 register 53, LANMAC4 register 54, and LANMAC5 register 55 is not within the MAC address range specified by the values in MAC0 register 30, MAC1 register 31, MAC2 register 32, MAC3 register 33, MAC4 register 34, MAC5 register 35 and MAC mask 36. Compare logic 39 does not assert LRFREJ signal 22 when the destination MAC address loaded into LANMAC0 register 50, LANMAC1 register 51, LANMAC2 register 52, LANMAC3 register 53, LANMAC4 register 54, and LANMAC5 register 55 is within the MAC address range specified by the values in MAC0 register 30, MAC1 register 31, MAC2 register 32, MAC3 register 33, MAC4 register 34, MAC5 register 35 and MAC mask 36.

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

I claim:

1. A system for filtering network packets comprising:
   a network controller that extracts a destination address from each network packet; and,
   a filter controller for receiving the destination address from the network controller and indicating to the network controller whether the destination address is outside a range of addresses, the filter controller comprising:

first storage means for storing a first value which indicates a base address for the range of addresses, second storage means for storing a second value which further specifies the range of addresses, and compare logic, coupled to the first storage means and the second storage means, the compare logic being dedicated hardware for comparing the destination address to the range of addresses specified by the first value and the second value, and for generating a signal that indicates when the destination address is outside the range of addresses.

2. A system as in claim 1 wherein the filter controller additionally comprises:

third storage means for temporarily storing the destination address while the compare logic compares the destination address to the range of addresses specified by the first value and the second value.

3. A system as in claim 2 wherein the destination address is a six-byte media access control (MAC) destination address.

4. A system as in claim 3 wherein:

the first storage means comprises six eight-bit registers;

the second storage means comprises two eight-bit registers; and the third storage means comprises six eight-bit registers.

5. A system as in claim 1 wherein the network packet has a frame topology that includes a preamble section, a destination address section, a source address section, a type section, a data section and a cyclical redundancy check (CRC) section.

6. A system as in claim 1 wherein the second value is an offset range limit.

7. A method for filtering network packets comprising the following steps:

(a) storing in a filter controller a first value which indicates a base address for a range of addresses;

(b) storing in the filter controller a second value which further specifies the range of addresses; and, (c) when a network packet is received, performing the following substeps:

(c.1) extracting, by a network controller, a destination address from the network packet, (c.2) forwarding the destination address from the network controller to the filter controller, (c.3) comparing, by the filter controller, the destination address to the range of addresses specified by the first value and the second value, wherein the comparing is performed by compare logic, the compare logic being dedicated hardware, and (c.4) generating, by the filter controller, a signal that indicates when the destination address is outside the range of addresses.

8. A method as in claim 7 wherein substep (c.1) includes temporarily storing the destination address within the filter controller while the filter controller compares the destination address to the range of addresses specified by the first value and the second value.

9. A method as in claim 8 wherein in substep (c.1), the destination address is a six-byte media access control (MAC) destination address.

10. A method as in claim 9 wherein:

in step (a) the first value is stored in six eight-bit registers;

in step (b) the second value is stored in two eight-bit registers; and in substep (c.1) the destination address is temporarily stored in six eight-bit registers.

11. A method as in claim 7 wherein in step (c) the network packet has a frame topology that includes a preamble section, a destination address section, a source address section, a type section, a data section and a cyclical redundancy check (CRC) section.

12. A method as in claim 7 wherein in step (b) the second value is an offset range limit.

* * * * *